(12) United States Patent
Burger et al.

(10) Patent No.: US 8,512,805 B2
(45) Date of Patent: Aug. 20, 2013

(54) METHOD FOR DISPENSING FOAM ONTO SUBSTRATES OF LARGE WIDTH

(75) Inventors: Ronald Burger, Duesseldorf (DE); Frank Jones, Mettmann (DE); Dirk Pannhausen, Neustadt (DE)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 13/416,449

(22) Filed: Mar. 9, 2012

(65) Prior Publication Data

US 2012/0183700 A1 Jul. 19, 2012

Related U.S. Application Data

(62) Division of application No. 12/106,724, filed on Apr. 21, 2008, now Pat. No. 8,156,889.

(30) Foreign Application Priority Data

Apr. 26, 2007 (DE) .......................... 10 2007 020 095

(51) Int. Cl.
*B05D 5/00* (2006.01)
(52) U.S. Cl.
USPC ............................. 427/244; 68/900; 118/712
(58) Field of Classification Search
USPC .......................................................... 68/900
See application file for complete search history.

(56) References Cited

U.S. PATENT DOCUMENTS

| 4,655,056 | A | * | 4/1987 | Zeiffer .......................... 68/205 R |
| 4,778,631 | A | * | 10/1988 | Cobbs et al. .................. 261/128 |
| 4,779,762 | A |  | 10/1988 | Klein et al. |
| 5,524,828 | A | * | 6/1996 | Raterman et al. ............. 239/413 |
| 5,556,471 | A | * | 9/1996 | Boccagno et al. ............ 118/300 |
| 5,629,076 | A |  | 5/1997 | Fukasawa et al. |
| 6,508,882 | B1 | * | 1/2003 | Zeiffer et al. ................. 118/684 |
| 2007/0051832 | A1 | * | 3/2007 | Jones et al. ................... 239/398 |

FOREIGN PATENT DOCUMENTS

| EP | 220450 A1 | * | 5/1987 |
| JP | 60261570 A |  | 12/1985 |
| JP | 7252318 A |  | 10/1995 |
| JP | 7308618 A |  | 11/1995 |
| JP | 2005028227 A | * | 2/2005 |

OTHER PUBLICATIONS

JP 2005-028227 Machine Translation.*
Japanese Patent Office, Office Action in JP Application No. 2008-115148, Jun. 4, 2012 (including English Translation).

* cited by examiner

*Primary Examiner* — Timothy Meeks
*Assistant Examiner* — Michael P Rodriguez
(74) *Attorney, Agent, or Firm* — Wood, Herron & Evans, L.L.P.

(57) ABSTRACT

A method for dispensing a foamed material onto a substrate surface, including: generating a relative movement between a substrate surface and a material dispensing apparatus exit opening, mixing at least two material components in a mixing device, generating a pressure differential between the mixing device and a dispensing region, conveying the dispensing material from the mixing device to the exit opening, and discharging the dispensing material from the exit opening onto the substrate surface.

12 Claims, 4 Drawing Sheets

METHOD FOR DISPENSING FOAM ONTO SUBSTRATES OF LARGE WIDTH

This application is a divisional of U.S. application Ser. No. 12/106,724, filed Apr. 21, 2008 (pending) which claims the priority of German Utility Model Application No. 102007020095.3 filed Apr. 26, 2007 under 35 U.S.C. §119. The disclosures of these applications are hereby fully incorporated by reference herein.

TECHNICAL FIELD

The invention relates to apparatus and methods for dispensing a foamed material onto a substrate surface.

BACKGROUND

In general, dispensing a foamed material is desirable where it is necessary to dispense a material but where as little dispensing material as possible is to be applied for reasons of cost or weight, for example, but without the thickness of the coating being less than a certain value. Foamed materials are dispensed, in particular, in industrial applications in which the aim is to glue together two substrates or components, but by using as little adhesive as possible in order to reduce the amount of costly adhesive consumed and to minimize the increase in weight of the glued substrates or products due to such gluing.

If uniform gluing is to be achieved, it is necessary to dispense the foamed material as uniformly as possible. Uniform dispensing is understood in this context to mean that the material may be dispensed along a precisely predetermined contour with regard to the edges of the applied coating in the longitudinal direction and direction of width, on the one hand, and on the other hand that the thickness of the applied coating correspond with as much precision as possible over the entire coating region to a predetermined contour of coating thickness, in particular that it run as uniformly as possible in the longitudinal direction and the direction of the width, and particularly that the same thickness prevail at each point of the dispensed coating.

Methods are known from DE 197 57 237 and DE 197 57 238 in which a mixture of gas and adhesive is dispensed from an exit opening onto a substrate in order to apply the coating. The mixture of gas and adhesive is previously generated in a mixing device and conveyed by means of a pump to the exit opening. One specific problem encountered when foamed material is applied in this way is that variations arise when conveying the foamed material and that, as a result, the desired uniformity of applied coating is not ensured in all forms of application and differently dimensioned variants of the coating. Particularly when foamed coatings having a large width are to be applied, for example a width of more than half a meter, in particular more than one meter, a coating is produced with the known method that is subject to substantial local variations, with the result that the quality of coatings and hence the quality of an adhesive bond obtained by means of the coating is not sufficient for many applications.

SUMMARY

The invention provides a method which achieves greater uniformity of the foamed coating than known methods, particularly in respect of the coating thickness.

More specifically, the dispensing material is kept under such a pressure in the adjacent region upstream from the discharge cross-section of the exit opening that the dispensing material in this region has a foaming rate that is less than 10% of the foaming rate which ensues at the end of the foaming process.

The term "foaming rate" within the meaning of the invention is meant the volume of the gaseous portion of the foam expressed as a percentage of the total volume of the foam material.

The invention is based on the realization that uniform dispensing of the foamed material can be achieved when the material in the adjacent region upstream from the discharge cross-section of the exit opening has a gaseous volume fraction that is as small as possible. When passing through the exit opening, the material has a substantially liquid or liquid-pasty volume fraction, as a result of which uniform conveying and dispensing of the dispensing material from the exit opening can be achieved.

This realization is applied, according to the invention, in such a manner that the dispensing material in the adjacent region upstream from the discharge cross-section of the exit opening is put under such a pressure that the gaseous components of the dispensing material are compressed to a large extent or dissolve in solution, i.e., change into or remain in the liquid state by physical change of phase or by chemical reaction or by suppression of such a phase change or reaction. According to the invention, the dispensing material is thus conveyed through the exit opening in a state that is almost completely a liquid phase and is depressurized thereby, as a result of which the foam can form to the desired extent in the region downstream from the exit opening and generates a uniform, foamed coating.

The discharge cross-section is understood here to be that part of the flow path of the dispensing material which is relevant for the flow resistance of the exit opening. This relevant part is generally represented by the region of narrowest cross-section. The discharge cross-section typically lies in the plane of the exit opening. However, it must be noted that the discharge cross-section may also lie upstream therefrom, since the flow resistance adjusts according to the properties of the material.

It needs to be understood that the pressure in the adjacent region upstream from the discharge cross-section of the exit opening, and necessary for the inventive method, is influenced on the one hand by the size of the discharge cross-section, and on the other hand is dependent on the volume of material conveyed through said discharge cross-section per unit of time and finally on the viscosity of the dispensing material. Hence, the pressure can essentially be influenced via these three parameters, i.e. the pressure in the desired region may be raised by increasing the conveying speed or the viscosity, or by reducing the size of the discharge cross-section.

The pressure necessary for performing the inventive method depends on the chemical and physical properties of the mixture of dispensing material. The pressure required depends, in particular, on the pressure at which the gaseous phase of the dispensing material dissolves in solution or liquefies, by a chemical or physical process, and at which it is kept in this state. As a further possible parameter for implementing the teaching of the invention, the dispensing material may be embodied such that it has a foaming rate of less than 10% of the foaming rate that is set at the end of the foaming operation, for certain other parameters defined, in particular, by a predefined dispensing speed, size of dispensing cross-section and viscosity.

According to a first preferred embodiment, the dispensing material is kept under such a pressure in the adjacent region upstream from the discharge cross-section of the exit opening that the dispensing material in this region has no gaseous portion. It has been found that the uniformity of the foam coating dispensed can be further increased when the dispensing material in the adjacent region upstream from the discharge cross-section contains exclusively liquid or liquid-pasty portions and therefore no gaseous portion. In this case, the throttle effect of the exit opening is especially constant locally and over time, and can therefore be well regulated, and the volume of dispensing material being discharged is highly constant, as a result of which uniform dispensing can be achieved.

According to another preferred embodiment, the dispensing material is kept under such a pressure in the region upstream from the discharge cross-section of the exit opening that the dispensing material in said region either has a foaming rate that is less than 10% of the foaming rate which ensues at the end of the foaming process, or has no gaseous portion. It has also been found that the uniformity of the dispensed foam can be further increased not only when a small or zero gas portion is present in the dispensing material in the region adjacent to the discharge cross-section of the exit opening, but also when no gaseous portion is present in the dispensing material in the entire region upstream from the discharge cross-section of the exit opening. By this means, a phase that is largely or completely liquid or liquid-pasty phase is conveyed across the entire region extending from the mixing device to the exit opening, as a result of which the conveyed volume per unit of time is kept highly constant, thus allowing the uniformity of the applied material to be substantially increased.

According to another preferred embodiment, the viscosity of the dispensing material is increased at least in the region of the discharge cross-section of the exit opening in order to increase the flow resistance in the discharge cross-section. By increasing the viscosity, it is possible to increase the flow resistance exerted by a discharge cross-section against the flow of the dispensing material through it, thus likewise increasing the pressure in the region upstream from the discharge cross-section. In this way, the suppression of gaseous phase portions in the dispensing material, as aimed at with the invention, can be achieved or at least supported. Various methods are available for increasing the viscosity, such as adding highly viscous components to the dispensing material.

It is particularly preferred that the dispensing material be cooled in order to increase the viscosity of the dispensed material. By cooling the dispensing material, the viscosity of normally all dispensing materials used nowadays can be significantly reduced by approaching the solidification temperature of the dispensing material, or by suppressing or delaying a chemical reaction that reduces the viscosity. According to the invention, it is possible to achieve the temperature reduction in the dispensing material by active cooling, for example by means of a heat exchanger having a coolant which is reduced in temperature relative to the ambient temperature. However, since the dispensing material is warmed in many cases to a temperature above the ambient temperature by the conveying operation and the pressurization, cooling within the meaning of the invention can be achieved by providing heat exchanging areas exposed to the ambient air and in heat flow contact with the desired cooling region when there is an efficient heat flow between these areas and the dispensing material. Increasing the viscosity is particularly suitable when using hot-melt dispensing materials, since these undergo a substantial increase in viscosity when cooled to a range just above their subsequent utilization temperature (in which they are present in the solid phase).

It is also preferred when the volume of the dispensing material fed to the exit opening is regulated in response to the pressure in the adjacent region upstream from the discharge cross-section of the exit opening, in particular in such a way that a constant pressure is maintained in the adjacent region upstream from the discharge cross-section of the exit opening. Rapid regulation of the pressure in the relevant region upstream from the discharge cross-section of the exit opening is achieved by such a pressure-dependent volumetric feed rate. If it is necessary to compensate for the greater discharge volume per unit of time from the exit opening resulting from the faster conveying speed, the relative speed between the substrate and the exit opening in proportion to the speed at which the dispensing material is conveyed must be controlled in order to maintain the uniformity of the applied material.

It is also preferred when the dispensing material is conveyed to the exit opening by means of a volumetric feed pump. Since the inventive method achieves a precisely defined throttle effect in the discharge cross-section of the exit opening, a volumetric feed pump may be used to feed the material against this throttle effect. A volumetric feed pump is understood here to be a pump which, depending on its control input variable, such as the rotational speed of a gear pump, feeds a certain volumetric stream that is in a preferably proportional ratio to said control input variable. One or a plurality of gear pumps are preferably used for the method of the invention, in order to achieve a volumetric feed rate.

According to one particularly preferred embodiment of the invention, the dispensing material is dispensed onto the substrate surface through a slot disposed as a discharge cross-section of the exit opening and parallel to the substrate surface to be coated, and the substrate surface and the exit opening move relative to each other during the dispensing process, in a direction which is transverse to the direction of slot extension. As explained at the outset, the problem of non-uniform application of a coating arises particularly when the substrate is to be coated with a layer in a direction that is longitudinal with respect to the foamed dispensing material, and which has a width which is more than half a meter transverse to the longitudinal direction, in particular more than one meter. When conventional dispensing methods are used in such applications, substantial variations in the thickness of the dispensed layer can occur in many cases, not only in the longitudinal direction of the coating, but also in the direction of its width. The inventive method thus provides special advantages, especially when used in coating operations involving a large width, and can be implemented in such a manner that a slot nozzle is used as the dispenser nozzle and provides a sufficient reduction in cross-section to achieve the pressure increase, required for the inventive method, in the region upstream from the discharge cross-section of the slot nozzle.

It is particularly preferred in this regard when the dispensing material is conveyed by means of a plurality of dispensing material feed pumps to a corresponding plurality of slot sections, wherein each slot section is assigned a dispensing material feed pump. It has been found that, despite applying the method of the invention, variation in uniformity can occur in the direction of width when the foamed dispensing material is dispensed in large widths. The aforementioned development is based on the realization that these variations in uniformity are substantially attributable to the fact that the dispensing material is not distributed uniformly over the full width of the slot nozzle when using a single feed pump. According to the invention, it is therefore provided that the slot of the slot nozzle be subdivided into a plurality of slot sections, and that each slot section be separately supplied with dispensing material by a feed pump assigned to said section. A slot section in this context is understood to be a section of the entire nozzle slot which is actually physically delineated, or merely as one section of the slot that is defined in a merely virtual sense. Whereas in the first configuration the individual slot sections are subdivided by a boundary formed between them, and behind which the stream of dispensing material combines downstream to form a common stream of material, the material is guided in the latter configuration such that it forms a contiguous stream of material upstream from, downstream from and in the slot, wherein said stream is not subdivided.

The inventive embodiment comprising a plurality of slot sections and with a dispensing material feed pump being assigned to each of the slot sections can be developed, in particular, by each slot section extending for less than 20 cm, in particular for 15 cm. This dimension has proved to be particularly advantageous in achieving uniform dispensing for a number of dispensing materials.

It is also preferred when the material is mixed in a mixing device to form a foam material, is conveyed to the dispensing head by means of a feed pump disposed in the mixing device and is conveyed inside the dispensing head to the exit opening disposed at the dispensing head by means of at least one second feed pump and preferably by a plurality of second feed pumps disposed inside the dispensing head. By providing a first and at least one second feed pump disposed at a distance from each other, it is possible, on the one hand, to achieve particularly well the degree of pressure control according to the invention in the pressure region required for the inventive method, below the pressure where foam is formed or the relevant foam is formed, without there being any necessity to mix the foam and dispense the foam from a single module. Instead, the arrangement allows the foam to be mixed and processed in a mixing device, and the foam to be dispensed from a dispenser head whose dimensions can therefore be kept very compact. Both the first feed pump and the second feed pump may be embodied here as one or as a plurality of individual feed pumps, wherein the first feed pump, in particular, may be embodied by two feed pumps operating fluid-mechanically in series with each other, and the second feed pumps may, in particular, be a plurality of feed pumps adjacent to one another and operating fluid-mechanically parallel to each other.

It is further preferred in this regard when the material inside the dispensing head is conveyed to a plurality of exit opening sections, each one of which is assigned to a second feed pump, by means of a plurality of feed pumps, preferably gear pumps, that are disposed in the dispensing head and operate in parallel. This development of the invention further improves in a decisive manner the uniform dispensing of the foam material over a large width, by subdividing the exit opening into a plurality of section which are each assigned to one of a plurality of second feed pumps operating in parallel. Due to this arrangement, each feed pump assigned to one of the exit opening sections can be controlled such that material is dispensed with a uniform thickness on the whole across the entire dispensing width. It should be understood in this regard that the exit opening sections may be sections that are actually physically separated from each other, or may also represent sections which are defined within one entire exit opening and only virtually assigned, without there being an actual physical separation between the exit opening sections exit, i.e. a virtual assignment of sections to their respective feed pumps.

It is further preferred in this regard when the pressure of the material inside the dispensing head, in the region between the feed pumps disposed in the dispensing head and the exit opening, is detected using one or more pressure sensors, and that the feed rate of the feed pumps disposed in the dispensing head is regulated in response to the detected pressure in such a way that the dispensing material in this region either has a foaming rate that is less than 10% of the foaming rate which ensues at the end of the foaming process, or has no gaseous portion. This development of the invention achieves precise regulation of the feed pump feed rate required for controlling the pressure according to the invention, in that a direct control loop is configured for controlling the pressure from the relevant regions to feed pumps that directly affect the pressure in these regions.

Another aspect of the invention is an apparatus for dispensing a foamed material onto a substrate surface, comprising: a mixing device which is in fluid connection with at least two sources of material and comprising a mixing unit for mixing the material components fed from said two sources of material to form a free-flowing, foamable dispensing material, a feed pump for generating a pressure differential between the mixing device and a dispensing region located downstream in the direction of flow from a discharge cross-section of the exit opening, an exit opening provided with a discharge cross-section which provides a flow resistance to the dispensing material flowing through said cross-section, wherein the discharge cross-section is dimensioned in such a way that the dispensing material in the adjacent region upstream from the discharge cross-section of the exit opening is kept under such a pressure that the dispensing material in this region has a foaming rate which is less than 10% of the foaming rate which ensues at the end of the foaming process. The apparatus according to the invention is particularly suitable for dispensing a foamed dispensing material in the manner of the inventive method.

For details, specific advantages and the ways in which the inventive apparatus operates, reference is made to the above description of the respective aspects of the method and the development thereof.

With reference to the first feed pump, in particular, it must be noted that said first feed pump may be embodied by one feed pump or by a plurality of feed pump operating in parallel or in series in order to provide the feed rate that is required. The second feed pumps may be disposed fluid-mechanically inside the dispensing head and may each supply a virtually or physically separated section of the exit opening with the dispensing material. Said second feed pumps operate fluid-mechanically in parallel and are preferably arranged on the dispenser in a parallel construction. They are preferably controlled individually so that individual control of their respective feed rates and hence of the dispensing material discharged from exit opening sections assigned to them is possible. As a result, any differences in the coating height of the dispensing material that arise across the width of the exit opening section, caused for example by different flow resistances in the supply sections, can be equalized and a uniform dispensing profile produced on the whole.

BRIEF DESCRIPTION OF THE DRAWINGS

A preferred embodiment of the invention shall now be described with reference to the Figures, in which.

DETAILED DESCRIPTION

Referring to FIGS. 1-4, a preferred embodiment of a dispensing apparatus according to the invention comprises a dispensing head 1 that has a closure housing 2a in which a pivotable shaft driven by a motor/transmission unit 2 is disposed. The pivotable shaft has a longitudinal slot through which a mixture comprising two components of a foamable material can pass through, when in a first pivot position, and cannot pass through, when in a second pivot position.

Dispensing head 1 comprises a total of eight material feed pumps 90a-h.

A slot nozzle 4 extending across the width of the dispensing head and transversely to the feeding direction of a substrate conveyed under the slot nozzle is disposed on dispensing head 1. Slot nozzle 4 extends over a width of 1.5 m. The discharge cross-section of the slot nozzle is dimensioned such that, between material feed pumps 90a-h and slot nozzle 4, a pressure is maintained which totally or almost totally prevents gaseous portions occurring in the dispensing material in the stream of material between material feed pumps 90a-h and slot nozzle 4. The pressure is so high that all or almost all gaseous portions dissolve in this section or are compressed to such an extent that a negligible gaseous volume fraction, in particular less than 10%, occurs in the dispensing material. Not until the material is discharged from slot nozzle 4 does the actual foaming and the concomitant expansion of the dispensing material occur.

Figure 1:
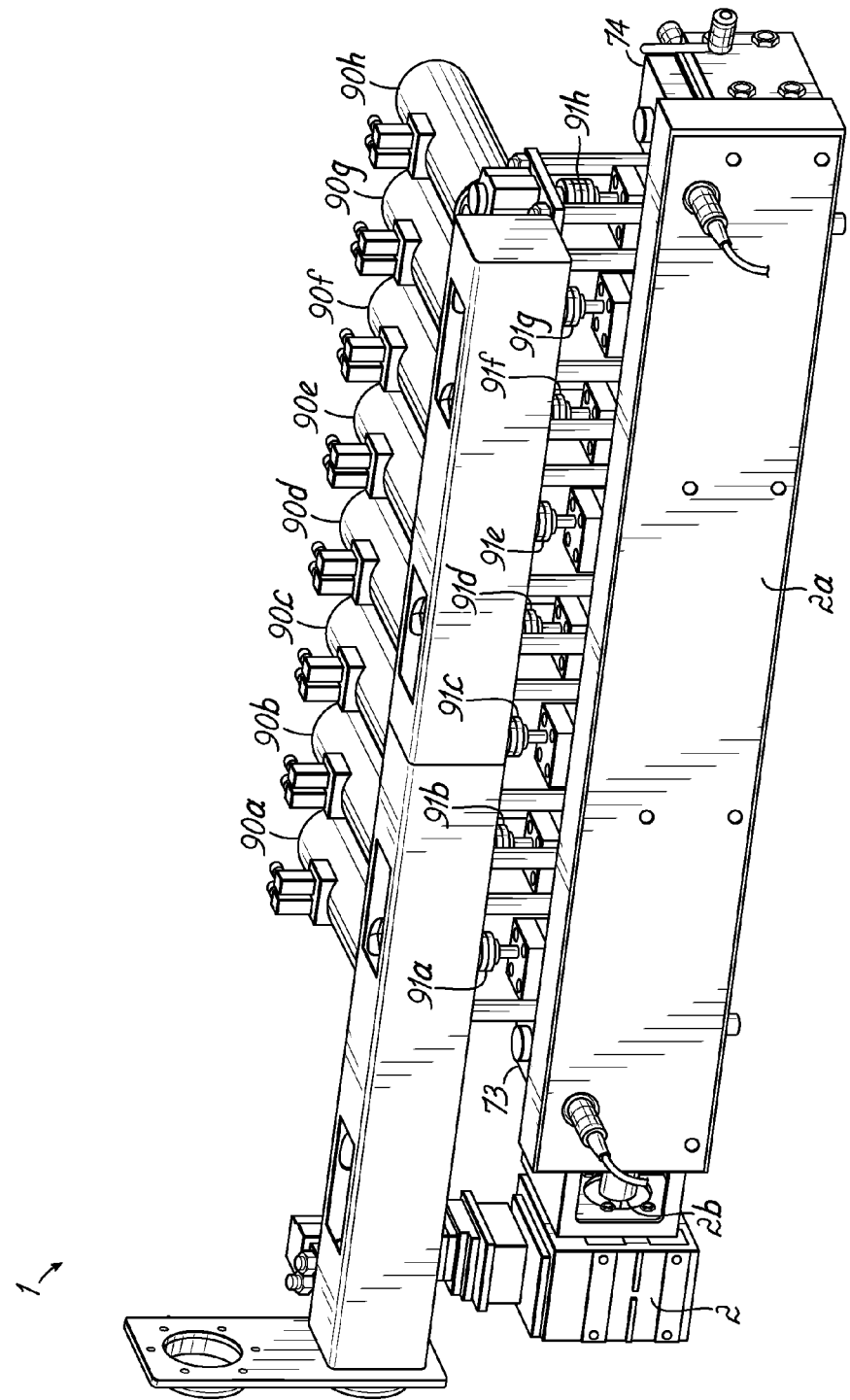
FIG. 1 shows a perspective view, from the side and from above, of the dispensing head of a dispensing device according to an embodiment of the invention.
Figure 2:
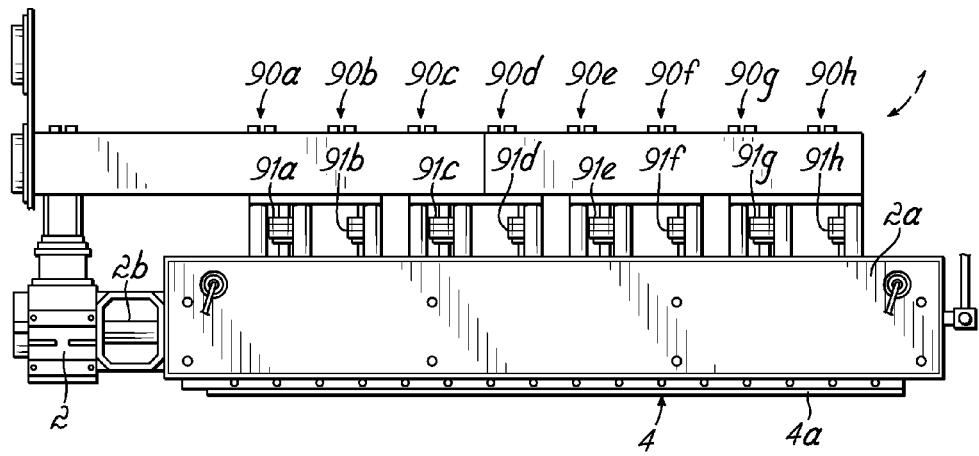
FIG. 2 shows a frontal view of the dispensing head in FIG. 1.
Figure 3:
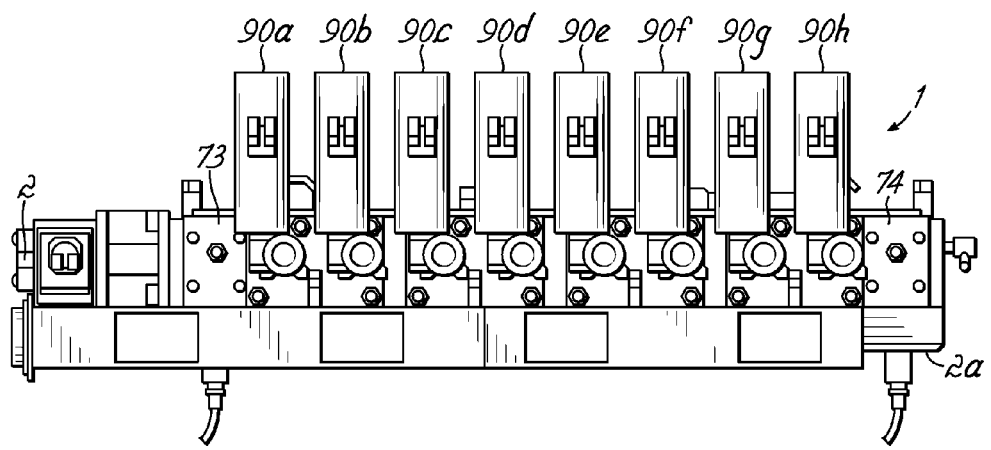
FIG. 3 shows a plan view of the dispensing head in FIG. 1.
Figure 4:
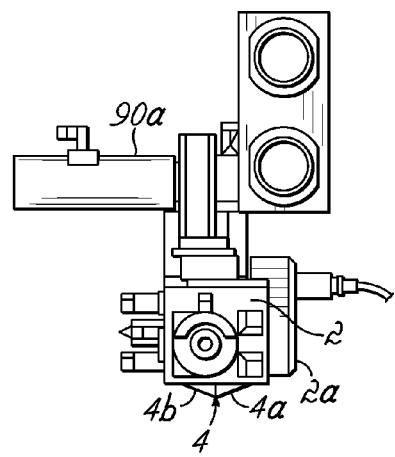
FIG. 4 shows a side view of the dispensing head of FIG. 1.
Figure 5:
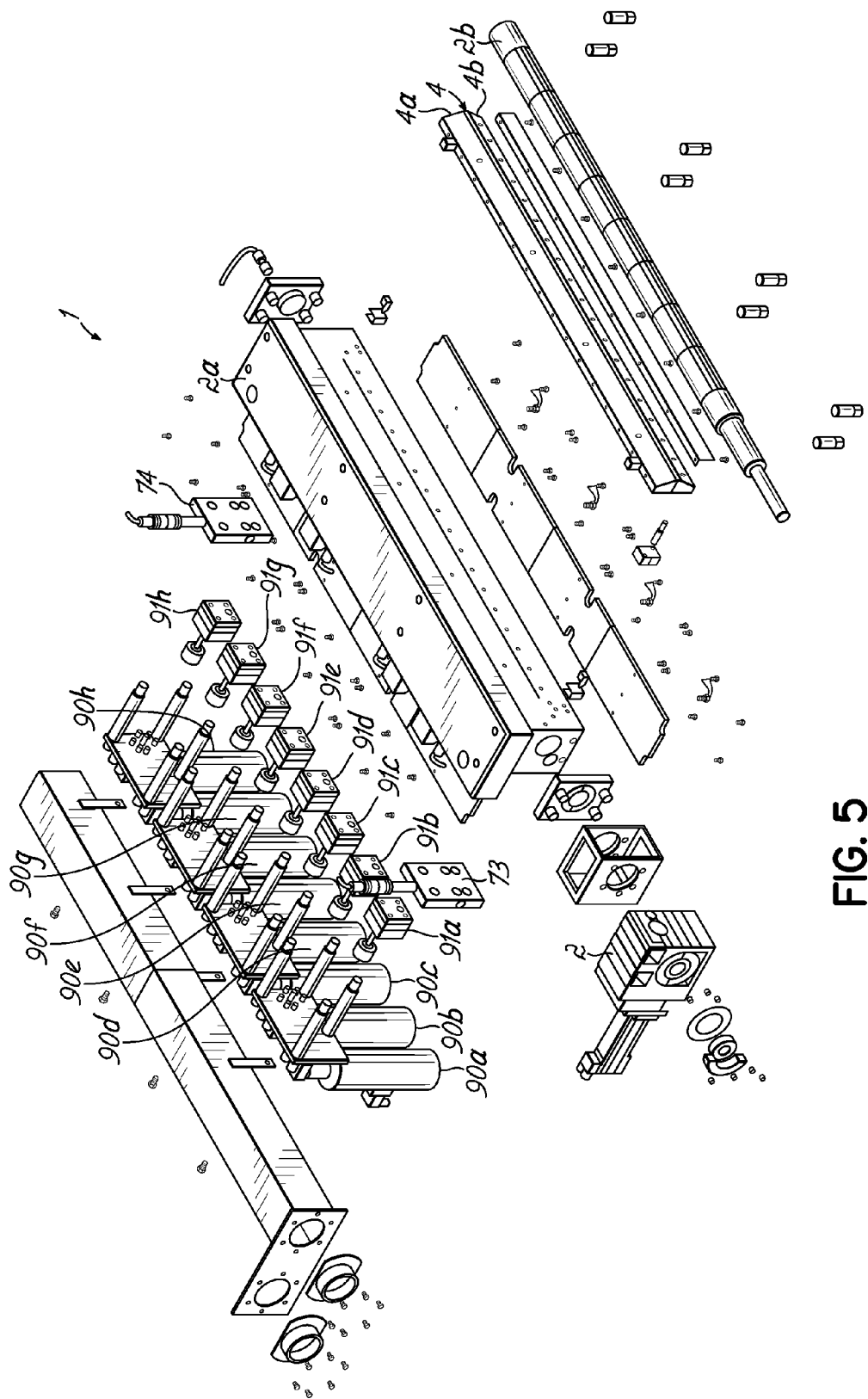
FIG. 5 shows an exploded view of the main components of a dispensing head according to an embodiment of the invention.

FIG. 5 shows an exploded view of an embodiment of a dispensing apparatus for carrying out the dispensing method according to the invention. The dispensing head comprises the closure housing 2a in which closure shaft 2b provided with a longitudinal slot is pivotably mounted. Closure shaft 2b can be pivoted by motor/transmission unit 2 in order to block or release the flow of material.

Below and in the direction of flow downstream from closure shaft 2b, a slot nozzle 4 which is defined by two defining edges 4a, 4b and through which the material can be discharged is disposed in housing 2a.

Laterally above, and upstream in the direction of flow from closure shaft 2b in housing 2a, a total of eight gear feed pumps 90a-h are disposed, each of which is driven by a separate electric motor 91a-h. Gear pumps 90a-h are each driven via an angular gear.

Gear pumps 90a-h are supplied with dispensing material from one feed line connected to the left end and one feed line connected to the right end of the dispensing head. Thus, outer gear pumps 90a and 90h each have a practically resistance-free source of dispensing material. In the respective regions where these two supply lines enter the dispensing head, a pressure sensor 73, 74 is disposed which measures the pressure upstream from the gear pumps.

Figure 6:
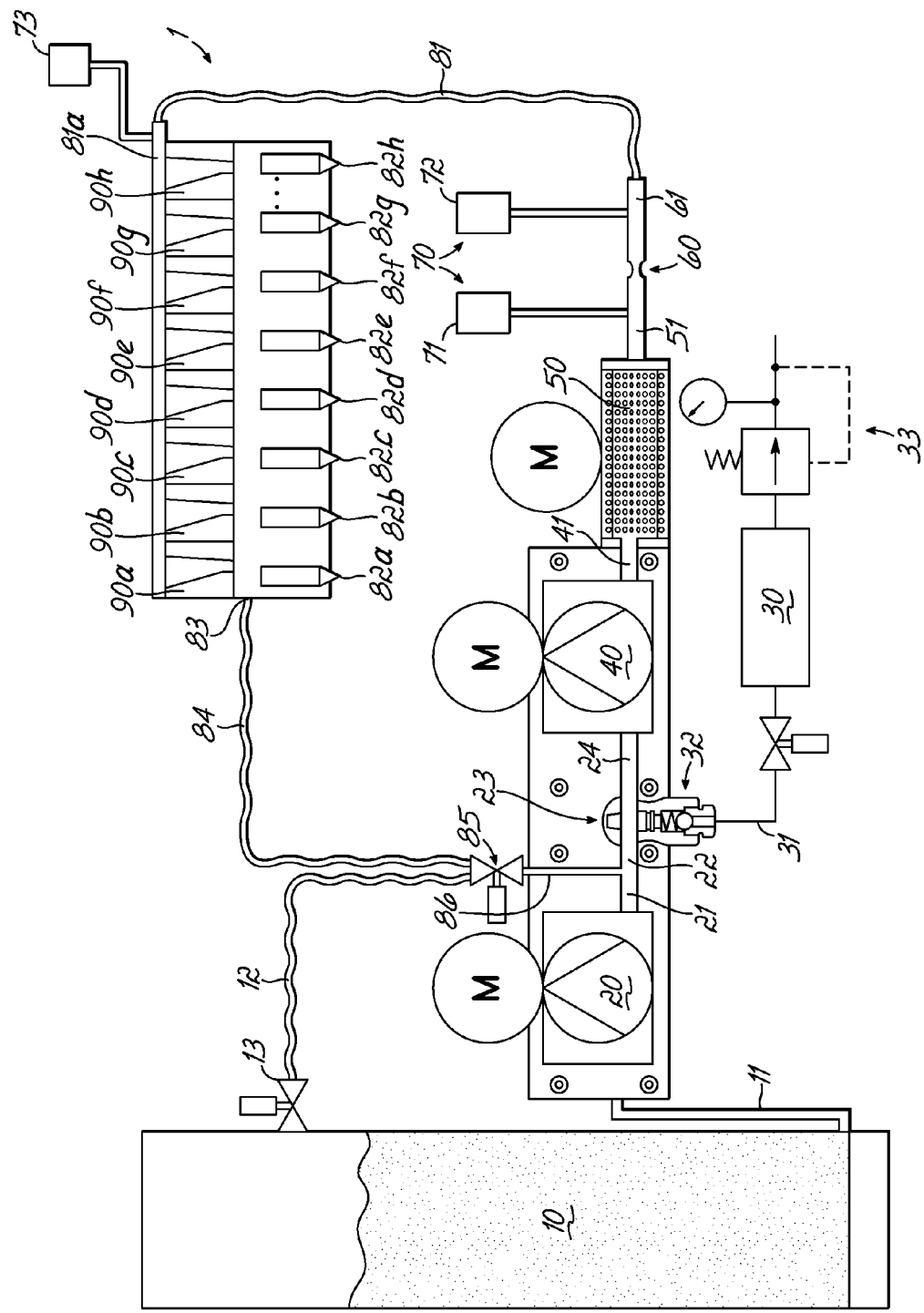
FIG. 6 shows a schematic view of the material flow inside the dispensing apparatus according to an embodiment of the invention.

FIG. 6 shows in a schematic flow diagram of the dispensing apparatus according to the invention.

The apparatus shown schematically in FIG. 6 comprises a material source 10 inside which a liquid dispensing material is kept. Material source 10 is connected via a first connection line 11 to a material feed pump 20, which conveys the material from the material source 10 into a second connection line 21.

The conveyed material passes out of second connection line 21 into a third connection line 22 and is mixed with air from an air supply line 31 at a T-piece 23.

The air which is fed to T-piece 23 via air supply line 31 is regulated in respect of its volumetric flow rate by an air control valve 30 and is connected at T-piece 23 to a nonreturn valve 32 which prevents material from being pressed out of line section 22 into air supply line 31. A controlled throttle valve 33 provides a constant input pressure for the air control device 30.

The mixed air/material mass is fed via a fourth connection line section 24 to a foam conveyor pump 40 which conveys the volume of air/material on its outlet side into a fifth connection line section 41 that opens into a mixing device 50.

Mixing device 50 is a rotary mixer in which the air/material volume is homogenously mixed, for example in the manner described in EP 0 220 450 B1. Reference is made here to EP 0 220 450 B1, in particular to the disk mixer according to column 4, line 21-column 5, line 51 and FIGS. 2-4 with the associated description.

The homogenously mixed foam material is fed from the mixing device through a sixth line section 51 of a throttle 60. Upstream and downstream from throttle 60 in the direction of flow of the foam, pressure sensors 71, 72 of a pressure measurement device 70 are arranged and can detect the pressure difference across throttle 60.

Pressure sensors 71, 72 are connected to a controller (not shown) in order to transmit their pressure measurement signal to said controller. The controller is connected to the gas flow control valve 30 in order to regulate the volumetric stream flow of the gas through line 31, depending on the pressure measurement signals from pressure sensors 71, 72

Downstream from throttle 60, the homogenously mixed material is conveyed through another line section 61 and a flexible hose 81 to a foam dispensing head 1. Foam dispensing head 1 comprises a plurality of foam dispensing sections 82a,b,c, . . . , h, from which the foam material is dispensed onto a substrate which runs below the exit openings of said foam dispensing nozzles.

Foam dispensing head 1 also has a throughhole opening 83 which is connected to a flexible hose portion 84. Said flexible hose portion 84 opens into a shut-off valve 85 which is connected to a line section 86. Between the second and third line sections 21 and 22, said line section 86 opens into the feed line between the material conveying pump 20 and T-piece 23, where air is added. The foam can be circulated via hose 84 and line section 86 by operating the foam conveying pump 40, without dispensing foam from foam dispensing sections 82a-h.

Shut-off valve 85 is also provided with a flexible hose 12 which is connected to hose section 84 and opens via a valve 13 into the upper, air-filled part of material source 10. Via said hose line 12, the material can be circulated through the entire system when material conveying pump 20 is in operation, without producing a critical increase in pressure in the system when no foam is dispensed from the foam dispensing nozzles 82a,b,c, . . . . To this end, valve 13 is opened when the dispensing of foam is stopped for a certain period of time.

In addition, the entire system can be flushed via hose line 12 by closing the foam dispensing nozzles, opening valve 13 and allowing circulation to occur until, for example, the entire system is filled with a new quality of foam.

A total of eight gear feed pumps 90a-h, which convey the dispensing material fed via hose line 81 and a distribution channel 81a to foam dispensing sections 82a-h, are flanged to dispensing head 1. A pressure sensor 73 is disposed on dispensing head 1 in order to detect the pressure in the feed line.

The sensor signal from pressure sensor 73 is used to control the feed rate of gear pumps 90a-h, in order to generate in this way the required pressure, according to the invention, for suppressing foam formation.

According to the invention, a pressure is maintained in the entire region downstream from the mixing device 50 as far as the exit opening of the foam dispensing sections 82a-h that completely suppresses the formation of foam in the dispensing material, or reduces such formation to such an extent at least that the foaming rate in this region is no more than 10% of the foaming rate which ensues at the end of the foaming process.

The foam generating and dispensing method according to the invention runs as follows:

Material dispensing pump 20 conveys material from material source 10 to foam conveyor pump 40. In a first operating mode, no air is added to said material, so the material is fed to dispensing head 80 by mixing device 50 without being mixed with air, with the consequence that unfoamed material from the material source is dispensed. In bypass operation via flexible lines 84,12, the material can be recycled when material dispensing pump 20 and foam conveyor pump 40 are being operated. Alternatively, in a second operating mode, the material can be circulated in a small loop via flexible line 84 and line section 86 when only foam conveyor pump 40 is being operated.

In a third operating mode, air or a different gas, such as nitrogen, is added to the conveyed material at T-piece 23, such that a gas/material mixture enters foam conveyor pump 40 and is conveyed from there to die mixing device 50. Premixing of the material and the gas occurs in the foam conveyor pump. In mixing device 50, this gas/material mixture is mixed to form a homogenous material mixture and is ultimately fed to dispensing head 1. At dispensing head 1, said foam material is dispensed from dispensing nozzles 82a-c onto a substrate.

If the dispensing operation is to be temporarily interrupted, then dispensing nozzles 82a-c are closed and the dispensing material is circulated via flexible line 84 with foam conveyor pump 40 in operation. In this situation, either the material dispensing pump can be switched off, or the material dispensing pump is likewise operated in the bypass mode, but returning the dispensing material via flexible lines 84, 12 into material source 10.

The foam generation and dispensing method is controlled by pressure sensors 71,72 detecting the pressure differential across throttle 60 and sending it to the controller. The controller compares the measured pressure differential with a predetermined pressure differential set for the desired foam quality and, depending on the difference between the actual pressure differential and the reference pressure differential, supplies the gas flow control valve 30 with a signal for increasing or decreasing the supply of gas, or controls the material conveying pump, the foam conveyor pump and/or the mixing device accordingly.

Another controlling or regulation effect is achieved by material dispensing pump 20 being embodied as a gear pump and generating a speed-dependent signal that is likewise supplied to the controller. In response to this speed-dependent signal, the controller now controls gas flow control valve 30 such that an increasing amount of gas is also fed to T-piece 23 if the rotational speed of material conveying pump 20 increases, and vice versa.

Material conveying pump 20, foam conveyor pump 40 convey the material, or the material containing the foam producing agent, at such a pressure into mixing device 50 that a pressure is produced downstream from mixing device 50 and as far as gear feed pumps 90a-90h which completely suppresses or extensively prevents the formation of foam. Gear feed pumps 90a-90h convey the dispensing material thus supplied, for their part, at such a pressure and as far as the discharge cross-section of the exit opening of foam dispensing sections 82a-82h that no formation of foam or only slight formation of foam occurs downstream from gear feed pumps 90a-90h and as far as the discharge cross-section.

While the present invention has been illustrated by a description of various embodiments and while these embodiments have been described in some detail, it is not the intention of the Applicants to restrict or in any way limit the scope of the appended claims to such detail. Additional advantages and modifications will readily appear to those skilled in the art. The various features disclosed herein may be used alone or in any combination depending on the needs and preferences of the user. The invention itself should only be defined by the appended claims.

What is claimed is:

1. A method for dispensing a foamed material onto a substrate surface, comprising:
   generating a relative movement between the substrate surface and an exit opening of a material dispensing apparatus, the exit opening including a slot oriented parallel to the substrate surface to be coated and transverse to the relative movement, the slot including an elongate width and a plurality of slot sections arranged along the elongate width,
   mixing at least two material components in a mixing device to form a free-flowing foamable dispensing material,
   generating a pressure differential between the mixing device and a dispensing region located downstream in the direction of flow from the exit opening,
   conveying the dispensing material from the mixing device to the material dispensing apparatus and to the exit opening,
   discharging the dispensing material from the exit opening onto the substrate surface by discharging a uniform flow rate of the dispensing material from each of the plurality of slot sections to ensure that the dispensing material is discharged uniformly across the elongate width of the slot, and
   maintaining a pressure of the dispensing material such that the dispensing material in a region upstream in the direction of flow from the exit opening exhibits a first foaming rate that is less than 10% of a second foaming rate occurring at the end of the foaming process following discharge from the exit opening.

2. The method of claim 1, wherein the pressure of the dispensing material is maintained such that the dispensing material in the upstream region has no gaseous portion.

3. A method according to claim 1, wherein a viscosity of the dispensing material is increased at the exit opening in order to increase the flow resistance in the exit opening.

4. A method according to claim 3, wherein the dispensing material is cooled in order to increase the viscosity of the dispensing material.

5. A method according to claim 1, further comprising:
   regulating a volume of the dispensing material conveyed to the exit opening in response to the pressure of the dispensing material located in the upstream region so that a constant pressure is maintained in the upstream region.

6. A method according to claim 1, wherein the dispensing material is conveyed to the exit opening by a volumetrically conveying pump.

7. A method according to claim 1, wherein the dispensing material is conveyed by a plurality of dispensing material feed pumps to the plurality of slot sections, wherein each slot section receives flow from one of the dispensing material feed pumps.

8. A method according to claim 7, wherein each slot section defines a length of less than 20 cm.

9. A method according to claim 1, wherein the dispensing material is conveyed to the material dispenser apparatus by a first feed pump located in the mixing device, and the dispensing material is further conveyed to the exit opening by at least one second feed pump located in the material dispensing apparatus.

10. A method according to claim 9, wherein the dispensing material located inside the material dispensing apparatus is conveyed to a plurality of exit opening sections by a plurality of second feed pumps located in the material dispensing apparatus and operating in parallel.

11. A method according to claim 10, further comprising:
sensing a pressure of the dispensing material located inside the material dispensing apparatus using one or more pressure sensors, and
regulating a feed rate of the second feed pumps in response to the detected pressure, such that the dispensing material in the upstream region either exhibits the first foaming rate or includes no gaseous portion.

12. A method for dispensing a foamed material onto a substrate surface, comprising:
generating a relative movement between the substrate surface and an exit opening of a material dispensing apparatus, the exit opening including a plurality of exit opening sections arranged along an elongate width of the substrate surface,
mixing at least two material components in a mixing device to form a free-flowing foamable dispensing material,
generating a pressure differential between the mixing device and a dispensing region located downstream in a direction of flow from the exit opening with a first feed pump,
conveying the dispensing material from the mixing device to the material dispensing apparatus with the first feed pump, and further conveying the dispensing material to the plurality of exit opening sections with a plurality of second feed pumps operating in parallel at the material dispensing apparatus,
discharging the dispensing material from the exit opening onto the substrate surface by discharging a uniform flow rate of the dispensing material from each of the plurality of exit opening sections to ensure that the dispensing material is discharged uniformly across the elongate width of the substrate surface, and
maintaining a pressure of the dispensing material such that the dispensing material in a region upstream in the direction of flow from the exit opening exhibits a first foaming rate that is less than 10% of a second foaming rate occurring at the end of the foaming process following discharge from the exit opening.

* * * * *